Dec. 14, 1926.

A. REINSCH 1,610,881

TILTING MECHANISM FOR LOAD CARS

Filed Oct. 16, 1924     3 Sheets-Sheet 2

Inventor:
ALFRED REINSCH
By
Attorneys

Dec. 14, 1926.
A. REINSCH
1,610,881
TILTING MECHANISM FOR LOAD CARS
Filed Oct. 16, 1924
3 Sheets-Sheet 3
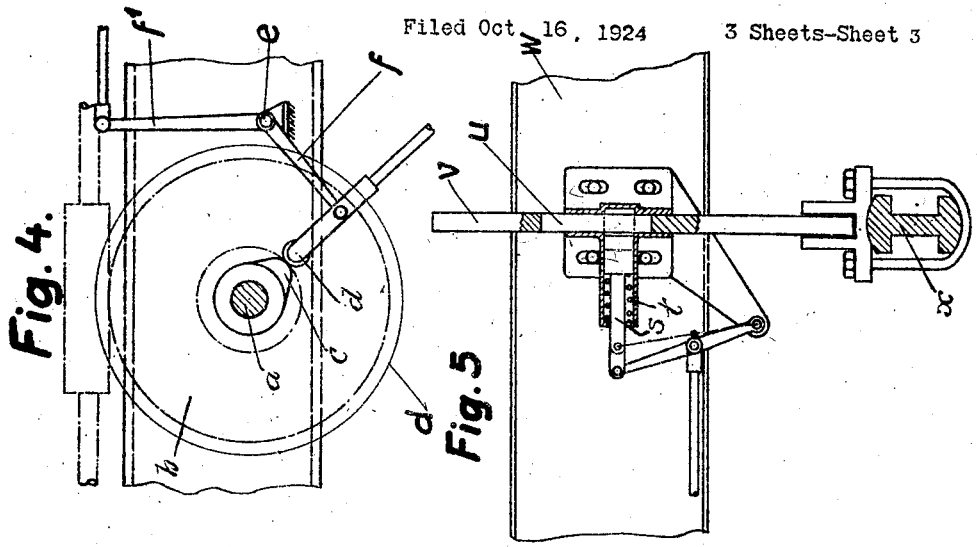
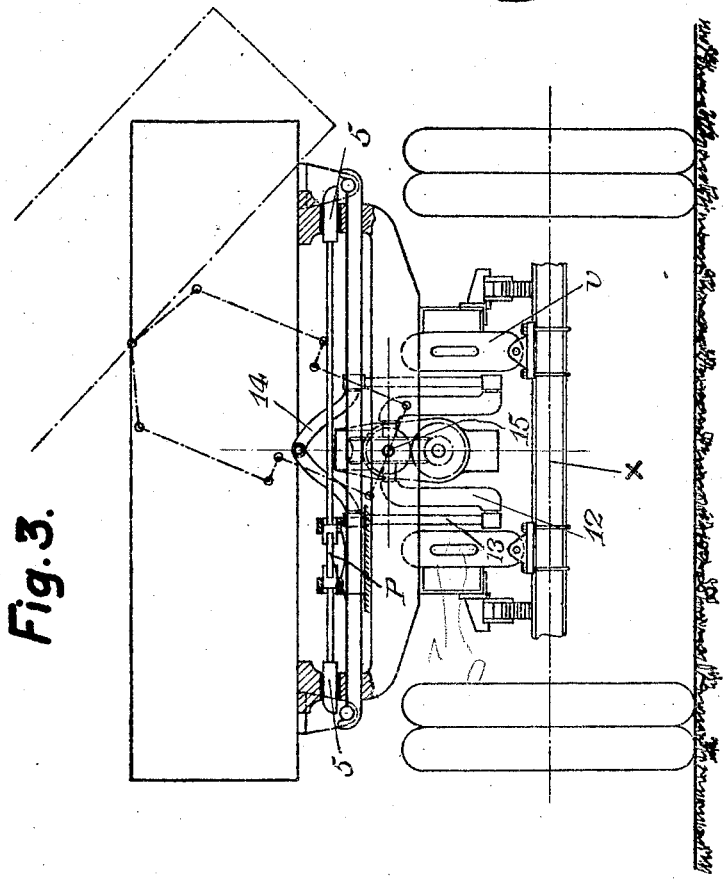
Inventor:
ALFRED REINSCH
By
Attorneys Patented Dec. 14, 1926.

1,610,881

UNITED STATES PATENT OFFICE.

ALFRED REINSCH, OF STUTTGART, GERMANY, ASSIGNOR TO DAIMLER-MOTOREN-GESELLSCHAFT, OF STUTTGART-UNTERTÜRKHEIM, GERMANY, A CORPORATION OF GERMANY.

TILTING MECHANISM FOR LOAD CARS.

Application filed October 16, 1924, Serial No. 744,077, and in Germany July 3, 1924.

In load cars having a container, which may be swung or tilted towards three sides, the case may occur, that by improper actuation of the tilting device after the lifting of the container an entire lifting of the latter from the frame of the car may take place. Furthermore in such vehicles, especially in case of sideward tilting of the loaded container by reason of the spring action and the one-sided strain put on the frame of the car, there may result large distortions of the frame, which are extremely injurious to the several parts of the driving mechanism.

In order to obviate these disadvantages according to this invention there is provided a construction, which will automatically lock the devices serving for the tilting of the container as well as for bracing the latter or the car frame against the rear axle during the start of the tilting motion. Moreover according to this invention, the locking device will remain operative, until the container has been swung back in its normal position during the driving of the car.

Figure 1:
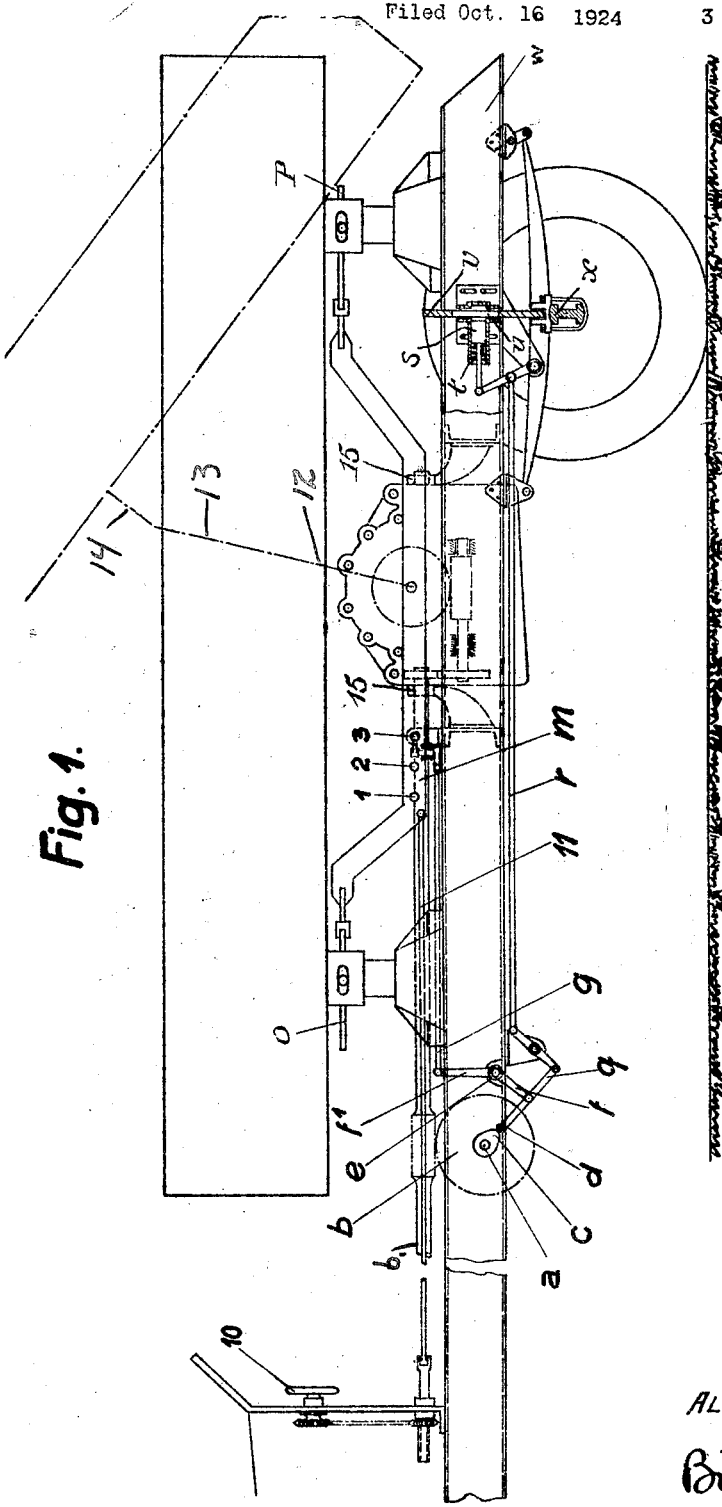
Figure 2:
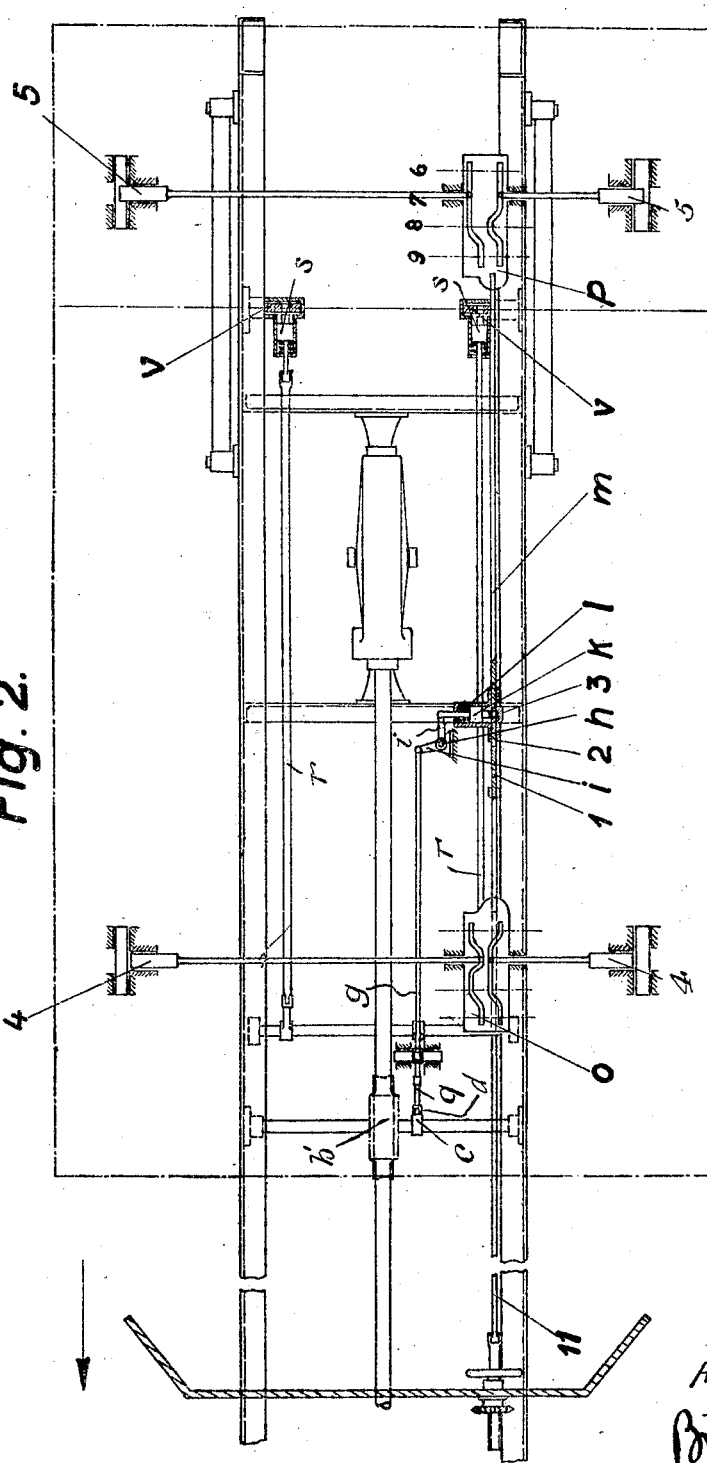

In the accompanying drawing forming a part hereof Fig. 1 is a side elevation showing the rear part of the chassis and cart of a three-way dumping car constructed in accordance with my invention; Fig. 2 is a plan view of the structure shown in Fig. 1; Fig. 3 is a rear elevation; Fig. 4 is a detailed side elevation showing on an enlarged scale, the mechanism for the automatic shifting of the bolt, which during dumping, holds the actuating rail which shifts the cam plates for operating the locking bolts for the dumping cart and Fig. 5 is an enlarged side elevation, partly in section, of the device for bracing the frame against the rear axle during the dumping of the cart.

The transverse shaft $a$, which is driven by means of a worm gearing $b$ from the main shaft $b_1$ leading to the tilting mechanism, carries a cam $c$, adapted at each complete revolution of the shaft $a$ to engage a lever $d$.

The lever $d$ is connected to a double lever or bell-crank $f$, $f_1$ which is swingingly mounted upon the shaft $e$, said bell-crank being connected with a rod $g$. This rod is pivoted to a further double lever or bell crank $i$, $i_1$ which is swingingly mounted upon the shaft $h$, the arm $i'$ of said bell crank being connected with a locking bolt $k$. This bolt is kept under the action of a spring $l$, which normally tends to move said bolt into one of the bores 1, 2, 3 positioned in the connecting bar $m$ between the cam plates $o$ and $p$. The lever $d$, which is actuated by the cam $c$, is further in connection with the locking bolts $s$, as shown especially in Figs 1, 2 and 5, through the rod mechanism $q$—$r$. Each bolt $s$ is kept under the action of a spring $t$ and is moved into the slot $u$ of a brace $v$, which is inserted between the frame $w$ and the axle $x$. The slot $u$ is provided for the purpose of avoiding a jamming of the bolt which may otherwise take place during unloading of the container by tilting and during upward motion of the temporarily released car spring.

Provided at any conveniently accessible place, as for example, upon the dash board of the vehicle, there is a hand wheel 10 which is connected by any suitable gearing with the front end of a connecting rod 11, the rear end of which is secured to the connecting bar $m$. This hand wheel is provided with suitable indicia to indicate positions of the wheel which correspond with certain definite positions of the cam plates $o$ and $p$. The cam plates $o$ and $p$ are provided with cam slots in which the inner ends of the bolts 4 and 5 engage, said slots being arranged to actuate said bolts to locked or unlocked positions according to the setting of the hand wheel 10 for the various tilted positions of the cart.

The cam plates may assume four different positions as indicated in Fig. 2 by the numerals 6, 7, 8 and 9. In the position designated with the reference numeral 6 all bolts are in locking condition, which is the case during the travel of the vehicle. In the position designated by the numeral 7, the container may be swung in backward direction. In this case the bolts 5 are in locking condition while the bolts 4 are unlocked. In the position designated by the numeral 8 the right-hand bolts 4 and 5 are brought into locking position, while the left-hand bolts are unlocked, the container of the car being tilted towards the right side, when looking in the direction of the arrow. In the position 9 the right-hand bolts 4 and 5 are unlocked and the left-hand bolts 4 and 5 are in locking condition.

In the last mentioned position the bolts 4 and 5 are locked for tilting the container towards the left hand side of the vehicle. When the cam plates are adjusted in the positions 7, 8 and 9, the bolt $k$ will be in position to be locked with the bores 3, 2, 1 respectively, provided in the connecting bar $m$.

After the cams $o$ and $p$ have been adjusted by the actuation of the hand wheel 10 according to the operation which is to be performed, the tilting mechanism is then placed in operation. This tilting mechanism comprises the parts 12, 13, 14 and 15 which, as they form no part of the present invention, have been more or less diagrammatically represented in Fig. 3 of the drawing. The gearing $b$ is constructed to cause the shaft $a$ to make a complete revolution during a complete upward and downward travel of the container when it is being tilted. Immediately after the lifting of the container is begun by the tilting mechanism, the cam $c$ moves out of engagement with the lever $d$, and thus permits the springs $l$ and $t$ to respectively move the bolt $k$ into one of the bores 1, 2, or 3 and the bolts $s$ into the slots $u$. The parts remain locked in this position until the container in a return movement approaches its downward limit of travel whereupon the lever $d$ will be again engaged by the cam $c$ to unlock the bolts $k$ and $s$.

The construction as described herein, as will be readily understood, is intended to serve merely as an example of the general idea according to this invention, which may be carried out in other ways also. Accordingly, for instance, this invention may also be employed with a container, which may be tilted only in the two lateral directions.

I claim:—

1. In a load car the combination of a container mounted to permit tilting in three directions, with operating means for tilting said container in any of said directions, and additional means for preventing a change in the direction of tilting, said latter means being in operative dependence upon said former means.

2. In a load car the combination of a container mounted to permit tilting in three directions, with operating means for tilting said container in any of said directions, and additional means for preventing a change in the direction of tilting, said latter means being in operative dependence upon said former means, and adapted to brace said container rigidly against a part of the car, for instance the rear axle.

3. In a load car comprising a frame and a load container, the combination of a cam mounted upon an operating mechanism for the tilting motion, a lever controlled by said cam during the starting of said motion, two groups of rod mechanisms associated with said lever, a springingly mounted bolt for locking and unlocking the container in its bearings, said bolt being controlled by the first group of said rod mechanisms, a further springingly mounted bolt provided at said frame of the car for bracing the wheels of said car against the frame thereof, said latter bolt being controlled by the second group of said rod mechanisms.

4. In a load car, a container mounted for tilting in three different directions, operating means to tilt said container in any of said directions, and locking devices for preventing a change in the direction of tilting after tilting in a given direction has started, said locking devices being operatively associated with said operating means to cause said devices to be actuated automatically by the operation of said means and including energy storing members actuated by said operating means during a part of the travel thereof to store potential energy in said members and released by further travel of said operating means to move said locking devices to locked position.

5. In a load car, a container mounted thereon for tilting in a plurality of directions, operating means to tilt said container in any one of said directions, and a plurality of locking devices to prevent a change in the direction of tilting after a tilting operation has started, and to brace said container rigidly during a tilting thereof, and a common means operated by said operating means to actuate said locking devices.

6. In a load car, a container mounted to permit tilting in three directions, operating means for tilting said container in any of said directions, and locking means including devices for preventing a change in the direction of tilting after tilting in a given direction has started, other devices for rigidly supporting said container during the tilting motion, a group of rod mechanisms connected with said devices and mechanism connected with said operating means to actuate said rod mechanisms.

7. In a load car, a container mounted for tilting in three different directions, operating means to tilt said container in any of said directions, and locking devices for preventing a change in the direction of tilting after tilting in a given direction has started, said locking devices being operatively associated with said operating means to cause said devices to be actuated automatically by the operation of said means.

8. In a load car, a chassis, a container mounted upon said chassis for tilting in three directions, operating means to tilt said container in any of said directions, springs interposed between said chassis and container, and locking devices associated with and actuated by said operating means to prevent a change in the direction of tilting after said operating means are placed in operation, said locking devices including means to brace said container against the rear axle of said car to prevent undue stress in said springs during the tilting operation.

9. In a load car, a container mounted for tilting in a plurality of directions, operating means to tilt said container in any one of said directions, a plurality of locking devices movable to different positions corresponding to the different tilting directions of said container, a manually operable control connected with said locking devices to set them selectively to any one of said different positions, and means operatively associated with said operating means to actuate said locking devices to locked position during the initial tilting of said container and thereby prevent a change in the direction of tilting of said container during a tilting operation.

10. In a load car, a container mounted for tilting in a plurality of different directions, operating means to tilt said container in any one of said directions, a manually operable control adapted to be set selectively to a plurality of different positions corresponding to the different directions of tilting of said container, locking devices operatively associated with said operating means and movable into locked position with said container to prevent a change in the tilting direction thereof during a tilting operation, connections between said locking devices and said control, and additional locking devices actuated by said operating means into engagement with said connections to prevent movement of said manually operable control during a tilting operation.

11. In a load car, having a container mounted for tilting in a plurality of different directions, operating means to tilt said container in any one of said directions, a manually operable control adapted to be set selectively to a plurality of different positions corresponding to the different directions of tilting of said container, a normally inoperative brace extending between the rear axle of said car and a rigid member of said car, a plurality of sets of locking devices, one set for preventing a change in the tilting direction of said container, a second set to lock said control against movement and a third set to lock said brace to said rigid member, during a tilting operation.

12. A load car as set forth in claim 11 in which said plurality of locking devices are operatively associated with said operating means and are movable into locked positions during the initial tilting movement of said container.

13. A load car as set forth in claim 11 in which a common means operatively connected with said operating means is provided for actuating all of said locking devices to locked positions.

In testimony whereof I affix my signature.

Dr. Ing. ALFRED REINSCH.